United States Patent
Matsuda

(10) Patent No.: US 7,181,554 B2
(45) Date of Patent: Feb. 20, 2007

(54) CONTROLLER DEVICE TO BE CONNECTED TO AN IEEE 1394 SERIAL BUS NETWORK

(75) Inventor: Masahiro Matsuda, Daito (JP)

(73) Assignee: Funai Electric Co., Ltd., Daito (JP)

( * ) Notice: Subject to any disclaimer, the term of this patent is extended or adjusted under 35 U.S.C. 154(b) by 302 days.

(21) Appl. No.: 11/001,637

(22) Filed: Dec. 2, 2004

(65) Prior Publication Data

US 2005/0138240 A1    Jun. 23, 2005

(30) Foreign Application Priority Data

Dec. 2, 2003    (JP) .............................. 2003-403024

(51) Int. Cl.
*G06F 13/00* (2006.01)
*G06F 15/177* (2006.01)

(52) U.S. Cl. ........................ 710/104; 710/8; 709/220

(58) Field of Classification Search ........ 709/220–221, 709/227, 245, 249; 710/8–10, 36, 104–106; 707/100, 5, 9
See application file for complete search history.

(56) References Cited

U.S. PATENT DOCUMENTS

2001/0056510 A1* 12/2001 Kobayashi ................. 710/36
2003/0001883 A1* 1/2003 Wang ........................ 345/736
2003/0069979 A1* 4/2003 Horiguchi ................... 709/227
2003/0188027 A1* 10/2003 Liu et al. .................... 709/249
2005/0021852 A1* 1/2005 Accarie et al. ............. 709/245
2005/0091345 A1* 4/2005 Matsuoka ................... 709/219

FOREIGN PATENT DOCUMENTS

JP    2003-046511    2/2003
JP    2003-134121    5/2003

* cited by examiner

*Primary Examiner*—Christopher Shin
(74) *Attorney, Agent, or Firm*—Crowell & Moring LLP

(57) ABSTRACT

A memory in a controller device stores a current function information list, which is a list of function information of each target device currently connected to an IEEE 1394 serial bus network, and also stores a past function information list which is a list of function information of each target device having been connected to the network in the past. When the controller device gets a GUID from a target device after bus reset, the controller device searches for a record of the target device corresponding to the gotten GUID from the records in the current function information list and the past function information list prior to the bus reset. As a consequence, if the controller device finds a record of the target device corresponding to the gotten GUID, the controller device copies such record in the current function information list or the past function information list prior to the bus reset, and stores the copied record in a current function information list made after the bus reset.

6 Claims, 7 Drawing Sheets

CURRENT POINTER LIST 31

| | POINTER OF PREVIOUS RECORD | POINTER TO RECORD OF CURRENT LIST X | POINTER OF NEXT RECORD |
|---|---|---|---|
| ✳data0 | ✳data6 | ✳A | ✳data1 |
| ✳data1 | ✳data0 | ✳B | ✳data2 |
| ✳data2 | ✳data1 | ✳C | ✳data3 |
| ✳data3 | ✳data2 | ✳D | ✳data4 |
| ✳data4 | ✳data3 | ✳E | ✳data5 |
| ✳data5 | ✳data4 | ✳F | ✳data6 |
| ✳data6 | ✳data5 | ✳G | ✳data0 |

FIG. 4

CURRENT LIST X 32

| | GUID | DEVICE INFORMATION | |
|---|---|---|---|
| ✳A | a | a(—) | ⎫ 30 |
| ✳B | b | b(—) | |
| ✳C | c | c(—) | ⎫ 35 |
| ✳D | d | d(—) | |
| ✳E | e | e(—) | |
| ✳F | f | f(—) | ⎫ 36 |
| ✳G | g | g(—) | |

FIG. 5

LIST Y 33

| | GUID | DEVICE INFORMATION |
|---|---|---|
| 39 ⎰ | h | h(—) |
| | i | i(—) |
| | j | j(—) |
| | k | k(—) |
| | l | l(—) |
| | m | m(—) |

FIG. 6

GUID LIST 34

| GUID |
|---|
| a |
| b |
| d |
| e |
| g |
| h } 37 |
| o } 38 |

FIG. 7

NEW POINTER LIST 40

| | POINTER OF PREVIOUS RECORD | POINTER TO RECORD OF NEW LIST X | POINTER OF NEXT RECORD | |
|---|---|---|---|---|
| ✻data0 | ✻data6 | ✻A | ✻data1 | } 48 |
| ✻data1 | ✻data0 | ✻B | ✻data2 | |
| ✻data2 | ✻data1 | ✻D | ✻data3 | |
| ✻data3 | ✻data2 | ✻E | ✻data4 | |
| ✻data4 | ✻data3 | ✻G | ✻data5 | |
| ✻data5 | ✻data4 | ✻H | ✻data6 | } 49 |
| ✻data6 | ✻data5 | ✻O | ✻data0 | } 50 |

FIG. 8

NEW LIST X 42

| GUID | DEVICE INFORMATION | |
|---|---|---|
| ✶A  a | a(—) | ⎫ 47 |
| ✶B  b | b(—) | |
| ✶D  d | d(—) | |
| ✶E  e | e(—) | |
| ✶G  g | g(—) | |
| ✶H  h | h(—) | ⎫ 43 |
| ✶O  o | SPACE | ⎫ 44 |

FIG. 9

LIST Y 33

| GUID | DEVICE INFORMATION | |
|---|---|---|
| c | c(—) | ⎫ 45 |
| f | f(—) | ⎫ 46 |
| i | i(—) | |
| j | j(—) | |
| k | k(—) | |
| l | l(—) | |
| m | m(—) | |

CONTROLLER DEVICE TO BE CONNECTED TO AN IEEE 1394 SERIAL BUS NETWORK

BACKGROUND OF THE INVENTION

1. Field of the Invention

The present invention relates to a controller device to be connected to an IEEE 1394 serial bus network, and more particularly to a technology to reduce traffic on the IEEE 1394 serial bus.

2. Description of the Related Art

A conventional controller device connected to an IEEE 1394 serial bus network (hereafter referred to simply as "network") sends, to each of target devices connected to the network, an inquiry command to inquire function of each target device after bus reset occurrence, and makes a list storing function information of each inquired target device in accordance with information returned from each target as a result of the inquiry, and further controls each target device in accordance with the function information of each target device stored in the list.

However, the use of such conventional controller device causes problems that the amount of data flowing through the bus significantly increases after bus configuration is completed, and that the recovery time for the network to return to its normal state at the time of bus reset occurrence becomes longer, because the inquiry command from the controller device to inquire the function of each target device as well as the information returned from each target device to the controller device as a result of the inquiry flows through the bus after bus configuration is completed.

SUMMARY OF THE INVENTION

An object of the present invention is to provide such a controller device to be connected to an IEEE 1394 serial bus network that makes it possible to make a list storing function information of each target device, while reducing the amount of data flowing through the bus after bus configuration is completed.

According to a first aspect of the present invention, this object is achieved by a controller device to be connected to an IEEE 1394 serial bus network via an IEEE 1394 serial bus, comprising: an IEEE 1394 interface (hereafter referred to as "interface") to send and receive data, such as commands and contents, to and from each target device on the IEEE 1394 serial bus network; a memory to store various data including function information of the each target device sent from the each target device via the interface; and a microprocessor to control the each target device in accordance with the function information of the each target device stored in the memory.

Therein, the memory stores a current function information list which is a list of function information of the each target device currently connected to the IEEE 1394 serial bus network, and which is made by the microprocessor in accordance with GUID and function information of the each target device sent from the each target device.

Therein, when the microprocessor gets GUID of the each target device from the each target device via the interface after bus reset, the microprocessor searches for a record of the target device corresponding to the gotten GUID from records in the current function information list, wherein if the microprocessor finds a record of such target device corresponding to the gotten GUID as a result of the search, the microprocessor allows the record of such target device to remain in the current function information list.

Such configuration described above is advantageous in that when the microprocessor gets GUID of the each target device from the each target device after bus reset, it is possible to acquire function information of the target device corresponding to the gotten GUID from the records in the current function information list, not directly from the each target device, if there is a record of the target device corresponding to the gotten GUID in the current function information list. Thereby, it becomes possible to reduce the number of times to perform the inquiry process, as compared with the conventional controller, that the microprocessor sends an inquiry command to the each target device to inquire its function and receives information from the each inquired target device as a result of the inquiry. Accordingly, after bus configuration is completed, it is possible to make a current function information list which is a list of function information of the each target device currently connected to the IEEE 1394 serial bus network, while reducing the amount of data flowing through the bus after bus configuration is completed. Furthermore, it is possible to shorten the recovery time for the IEEE 1394 serial bus network to return to its normal state at the time of bus reset occurrence. These effects become more apparent in the cases where there are more targets devices to be controlled by the controller device, and where additional target devices are connected to or some target devices are removed from already configured IEEE 1394 network.

Preferably, the memory further stores a past function information list which is a list of function information of each target device having been connected to the IEEE 1394 serial bus network in the past, wherein if the microprocessor fails to find a record of the target device corresponding to the gotten GUID as a result of the search from the records in the current function information list, the microprocessor searches for a record of the target device corresponding to the gotten GUID from records in the past function information list, and wherein when the microprocessor finds a record of the target device corresponding to the gotten GUID as a result of the search from the records in the past function information list, the microprocessor adds, to the current function information list, a record formed on the basis of such record in the past function information list, and deletes such record from the past function information list.

This configuration is advantageous in that when the microprocessor gets GUID of the each target device from the each target device after bus reset, it is possible to acquire function information of the target device corresponding to the gotten GUID from the records in the past function information list, not directly from each target device, if there is a record of the target device corresponding to the gotten GUID in the past function information list, even if there is no record of the target device corresponding to the gotten GUID in the current function information list.

Further preferably, the current function information list comprises: a first list of records actually storing data of function information of the each target device currently connected to the IEEE 1394 serial bus network; and a second list which is a circular list of records storing pointers to the records in the first list.

According to a second aspect of the present invention, the above-described object is achieved by a controller device to be connected to an IEEE 1394 serial bus network via an IEEE 1394 serial bus, comprising: a transmission means to send and receive data, such as commands and contents, to and from each target device on the IEEE 1394 serial bus network; a storage means to store various data including function information of the each target device sent from the each target device via the transmission means; and a control means to control the each target device in accordance with the function information of the each target device stored in the storage means.

Therein, the storage means stores a current function information list which is a list of function information of the each target device currently connected to the IEEE 1394 serial bus network, and which is made by the control means in accordance with GUID and function information of the each target device sent from the each target device.

Therein, when the control means gets GUID of the each target device from the each target device via the transmission means after bus reset, the control means searches for a record of the target device corresponding to the gotten GUID from records in the current function information list, wherein if the control means finds a record of such target device corresponding to the gotten GUID as a result of the search, the control means allows the record of such target device to remain in the current function information list.

Preferably, the storage means further stores a past function information list which is a list of function information of each target device having been connected to the IEEE 1394 serial bus network in the past, wherein if the control means fails to find a record of the target device corresponding to the gotten GUID as a result of the search from the records in the current function information list, the control means searches for a record of the target device corresponding to the gotten GUID from records in the past function information list, and wherein when the control means finds a record of the target device corresponding to the gotten GUID as a result of the search from the records in the past function information list, the control means adds, to the current function information list, a record formed on the basis of such record in the past function information list, and deletes such record from the past function information list.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 4 is a table showing contents of a current list X stored in the controller device;

FIG. 5 is a table showing contents of a list Y stored in the controller device prior to bus reset;

FIG. 6 is a table showing contents of a GUID list stored in the controller device;

FIG. 7 is a table showing contents of a new pointer list stored in the controller device;

FIG. 8 is a table showing contents of a new list X stored in the controller device;

FIG. 9 is a table showing contents of the list Y after the bus reset;

DESCRIPTION OF THE PREFERRED EMBODIMENTS

The best mode and preferred embodiment of the present invention will be described hereinafter with reference to the annexed drawings. The specific embodiment described is not intended to cover the entire scope of the present invention, and hence the present invention is not limited to only the specific embodiment.

Figure 1:
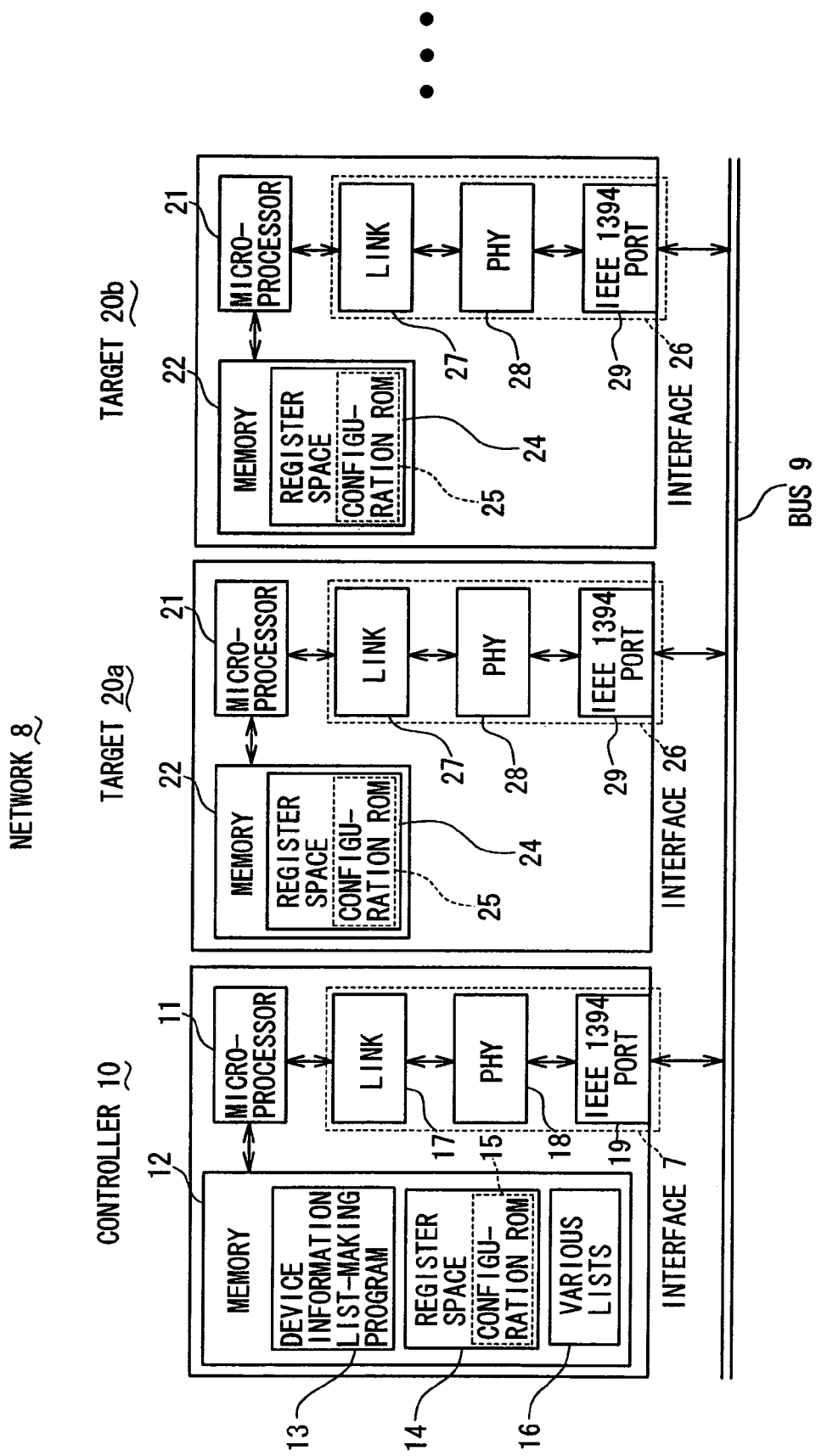
FIG. 1 is a schematic electrical block diagram showing a controller device according to a best mode embodiment of the present invention as well as target devices.

FIG. 1 shows a schematic electrical block diagram of a controller device 10 according to an embodiment of the present invention as well as target devices 20a and 20b to be controlled by this controller device 10. The controller device 10 (hereafter referred to simply as "controller") is connected via an IEEE 1394 serial bus 9 (hereafter referred to simply as "bus") to the target devices 20a and 20b (hereafter referred to collectively as "target(s) 20") to be controlled. An IEEE 1394 serial bus network (hereafter referred to simply as "network") 8 comprises the controller 10 and the target(s) 20.

The controller 10 comprises a microprocessor 11 to control the entire system and a memory (claimed "storage means") 12 to store various data. The microprocessor 11 also provides a function of application layer in the IEEE 1394 protocol and serves as claimed control means. The memory 12 stores: a device information list-making program 13 which is a program to make a list storing GUID (Global Unique Identifier: identification information specific to each device on the network 8) and function information of each target 20 that are needed to control each target 20; a register space 14 storing various information regarding the controller 10 itself and the other connected devices on the network 8; various lists 16 made by the device information list-making program 13; and so on. The register space 14 stores a configuration ROM (read-only memory) 15 storing information such as GUID of the controller 10 itself.

The controller 10 further comprises: a LINK 17 to provide services at link layer level in the IEEE 1394 protocol; a PHY 18 to provide services at physical layer level in the IEEE 1394 protocol; and an IEEE 1394 port 19 to connect a cable for the bus 9. An IEEE 1394 interface 7 (hereafter referred to simply as "interface": claimed "transmission means") comprises the above LINK 17, PHY 18 and IEEE 1394 port 19. Like the controller 10, each of the targets 20 comprises a microprocessor 21, a memory 22, an interface 26, a LINK 27, a PHY 28 and an IEEE 1394 port 29, wherein the memory 22 contains a register space 24. However, in contrast to the controller 10, the memory 22 does not store items such as the device information list-making program 13 and the various lists 16.

Figures 2, 3:
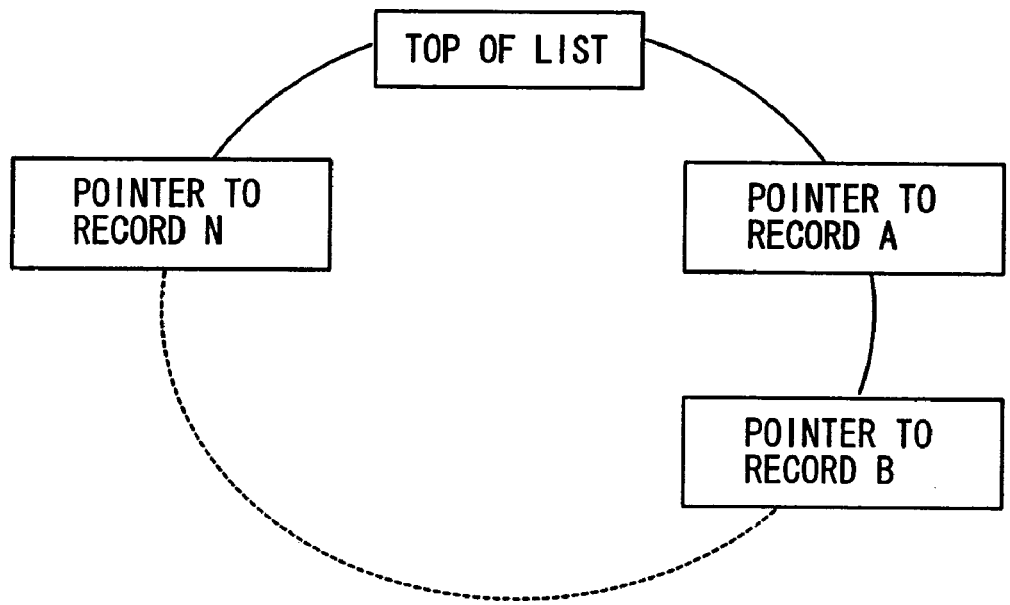
FIG. 2 is a schematic chart showing an image of a current pointer list stored in the controller device.
FIG. 3 is a table showing contents of the current pointer list.

Referring to FIG. 2 to FIG. 5, the various lists 16 stored in the memory 12 of the controller 10 will be described hereinafter. The various lists 16 include: a current pointer list 31 and a current list X 32 (collectively, claimed "current function information list") that are lists of function information of targets 20 currently connected to the network 8; and a list Y 33 (claimed "past function information list") that is a list of function information of targets 20 having been connected to the network 8 in the past. The device information in the current list X 32 shown in FIG. 4 and the device information in the list Y 33 shown in FIG. 5 consist mainly of the function information of the targets 20. As shown in FIG. 4, the current list X 32 is a list of records A to G actually storing data of device information (claimed "function information") of the targets 20 which are currently connected to the network 8. On the other hand, as shown in FIG. 2 and FIG. 3, the current pointer list 31 is a circular list of records storing pointers *A to *G to the records A to G of the current list X 32, respectively. The claimed current function information list thus comprises the current list X 32 (first list) and the current pointer list 31 (second list).

If the microprocessor 11 of the controller 10 has not made a current pointer list 31 or a current list X 32 even once in the past, the microprocessor 11 sends an inquiry command to all the targets 20 to inquire function of each target 20, and makes a current pointer list 31 and a current list X 32 in accordance with information returned from each target 20 as a result of the inquiry. The microprocessor 11 holds records stored in the current pointer list 31 and the current list X 32 even if the power is turned off. When detecting bus reset occurrence, the microprocessor 11 gets GUID from each target 20 by reading the configuration ROM 25 of each target 20 after bus configuration is completed, and the microprocessor 11 makes a GUID list 34 based on gotten GUIDs as shown in FIG. 6. If the GUID list 34 does not contain GUIDs of records having been stored in the current list X 32 prior to the bus reset occurrence, then the microprocessor 11 transfers such records in the current list X 32 to the list Y 33. Even if the power is turned off; the records in the list Y 33 are held. However, if the power is turned off, the records in the GUID list 34 are erased.

Figure 10:
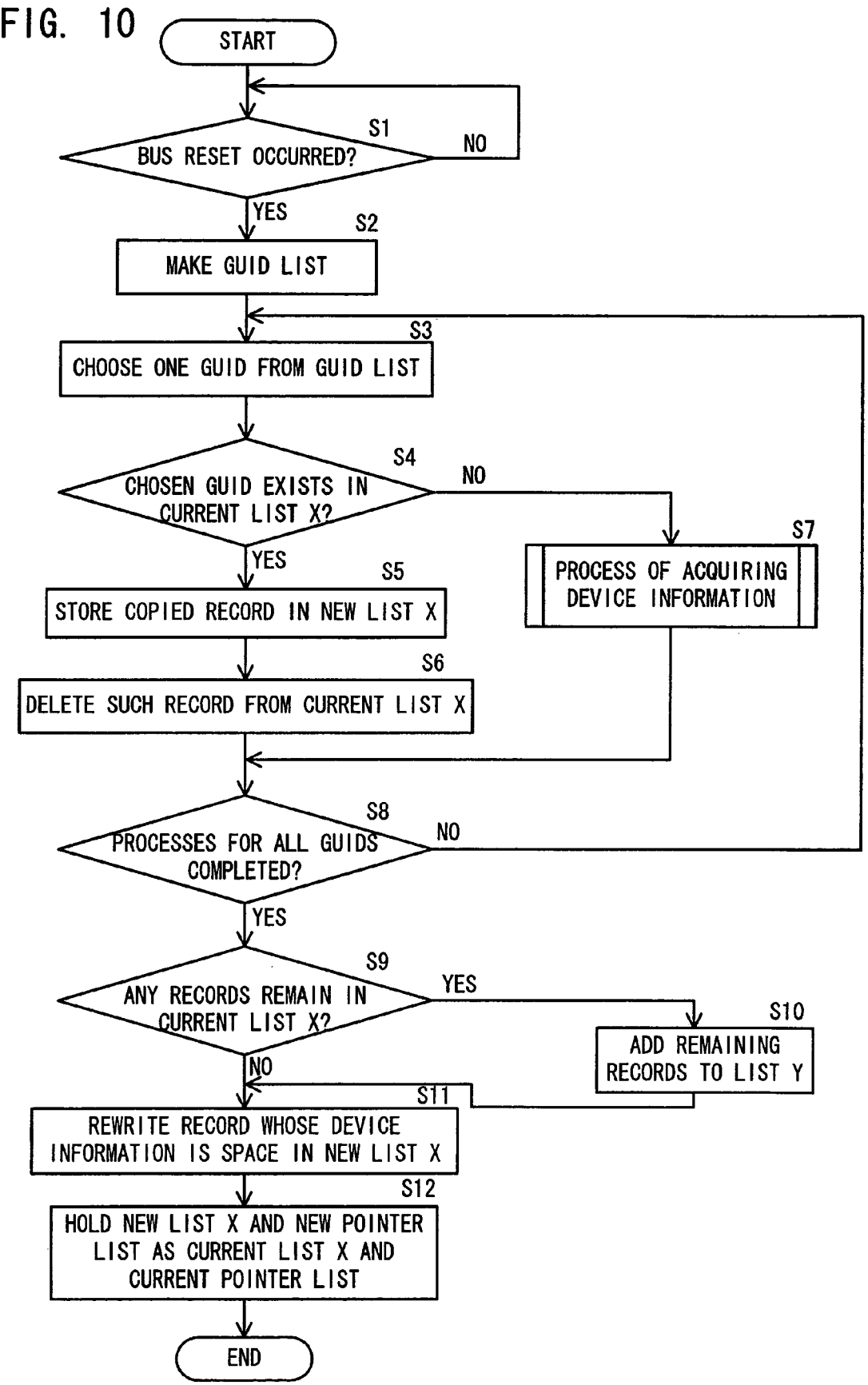
FIG. 10 is a schematic flow chart showing processes of the controller device in the case where a new target device is added to the network, and where a target device connected to the network is removed.

In the following, referring to FIG. 3 to FIG. 9 together with the flow charts of FIG. 10 and FIG. 11, the processes of the controller 10 will be described in the cases where a new target 20 is added to the bus 9, and where a target 20 connected to the bus 9 is removed therefrom. As shown in the flow chart of FIG. 10, the microprocessor 11 of the controller 10 makes a GUID list 34 as shown in FIG. 6 (S2) when getting GUID from each target 20 after bus reset is occurred (SI) and bus configuration is completed. Next, the microprocessor 11 makes a new pointer list 40 (refer to FIG. 7) in the same format as that of the current pointer list 31 prior to the bus reset occurrence as shown in FIG. 3, and also makes a new list X 42 (refer to FIG. 8) in the same format as that of the current list X 32 prior to the bus reset occurrence as shown in FIG. 4. It is to be noted that FIG. 7 and FIG. 8 show the new pointer list 40 and the new list X 42 in both of which records have already been stored, and that such records are not yet stored therein at a stage immediately after the bus reset occurrence.

Next, the microprocessor 11 chooses one GUID from the GUID list 34 (S3), and checks whether or not a record storing this chosen GUID exists in the current list X 32 prior to the bus reset occurrence (S4). For example, in the case where GUIDs as shown in FIG. 6 are stored in the GUID list 34, the microprocessor 11 chooses the first GUID (a) therein, and checks whether or not a record storing this GUID (a) exists in the records A to G in the current list X 32 as shown in FIG. 4. If, as in this case, a record storing such chosen GUID (a) exists in the records in the current list X 32 (YES in S4), then the microprocessor 11: copies such record A in the current list X 32 as shown by reference numeral 30 in FIG. 4; stores the copied record A in the new list X 42 (the current list X 32 in the future) as shown by reference numeral 47 in FIG. 8 (S5); and furthermore adds, to the new pointer list 40 (the current pointer list 31 in the future), a record (data0) storing a pointer (*A) to in the new list X 42 as shown by reference numeral 48 in FIG. 7.

In other words, when the microprocessor 11 gets GUID of each target 20 from the each target 20 via the interface 7 after bus reset, the microprocessor 11 searches for a record of the target 20 corresponding to the gotten GUID from records in the the current list X 32. As a result of the search, if the microprocessor 11 finds a record of such target 20 corresponding to the gotten GUID, the microprocessor 11 stores the records of such target 20 in the new list X 42 (the current list X 32 in the future) and the new pointer list 40 (the current pointer list 31 in the future). Or to put it another way, if the microprocessor 11 finds a record of such target 20 corresponding to the gotten GUID, the microprocessor 11 allows the records of such target 20 to remain in the current list X 32 and the current pointer list 31.

Thereafter, the microprocessor 11 deletes, from the current list X 32, such record A as shown by reference numeral 30 in FIG. 4 (S6). On the other hand, if a record storing GUID chosen from the GUID list 34 does not exist in the current list X 32 prior to the bus reset occurrence, the microprocessor 11 performs a process of acquiring device information (S7) as follows.

Figure 11:
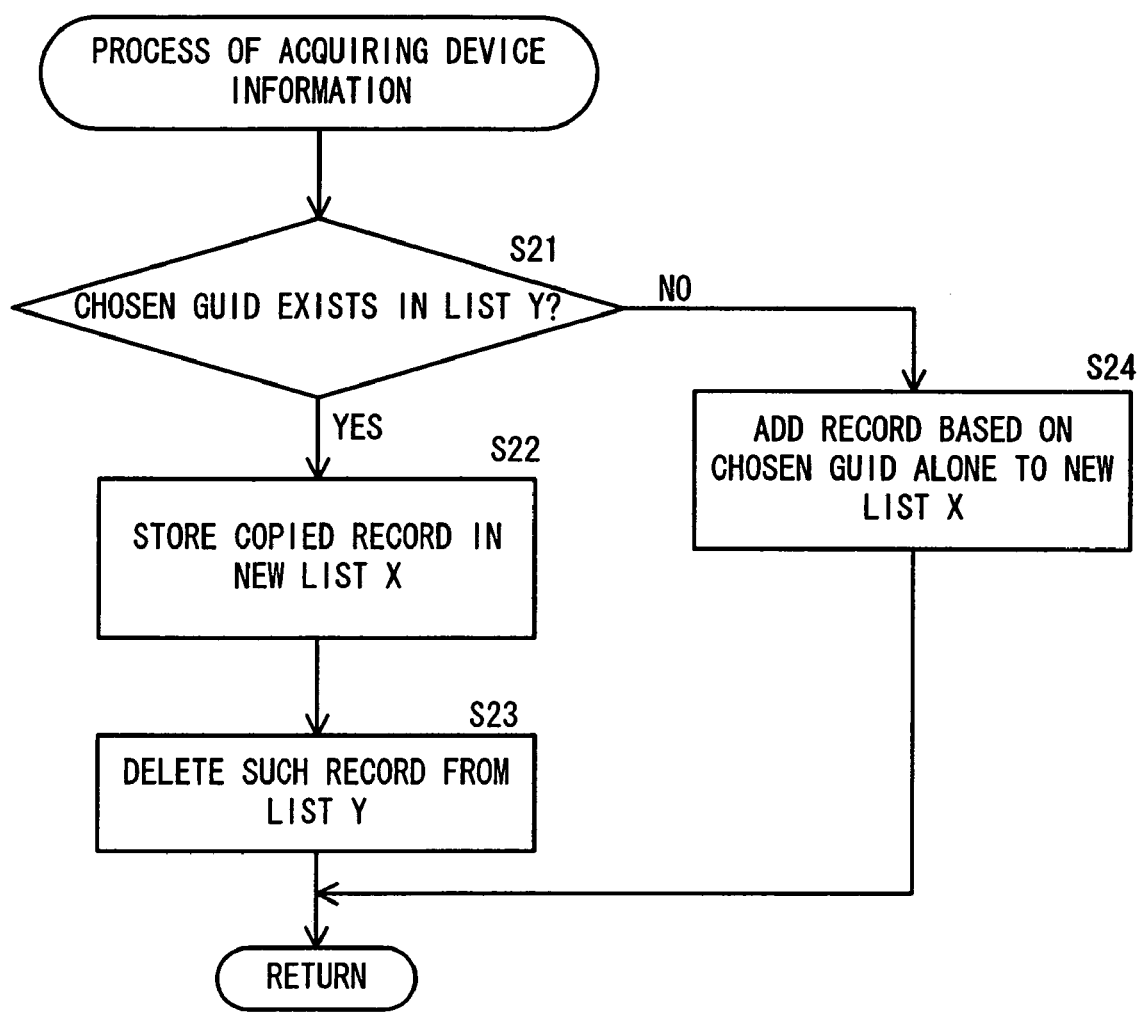
FIG. 11 is a schematic flow chart showing a process of acquiring device information in FIG. 10.

Referring to FIG. 11, the process of acquiring device information will be described. In the current list X 32 prior to the bus reset occurrence, no record exists which stores, e.g., GUID (h) as shown by reference numeral 37 or GUID (o) as shown by reference numeral 38 in FIG. 6. If the GUID chosen in the above step S3 is such GUID as non-existing in the current list X 32, the microprocessor 11 checks whether or not a record storing such chosen GUID exists in the list Y 33 shown in FIG. 5 (S21). For example, if the GUID chosen in the above step S3 is "h" as shown by reference numeral 37 in FIG. 6, a record 39 having GUID="h" exists in the list Y 33 as shown in FIG. 5. Accordingly, the microprocessor 11: copies such record 39 in the list Y 33; stores, in the new list X 42, a record H as shown by reference numeral 43 in FIG. 8 (S22); and furthermore adds, to the new pointer list 40, a record (data5) storing a pointer (*H) to the record H in the new list X 42 as shown by reference numeral 49 in FIG. 7. Thereafter, the controller 10 deletes such record 39 from the list Y 33 shown in FIG. 5 (S23).

In other words, if the microprocessor 11 fails to find a record of the target 20 corresponding to the gotten GUID as a result of the search from the records in the the current list X 32, the microprocessor 11 searches for a record of the target 20 corresponding to the gotten GUID from records in the list Y 33. As a result of the search, when the microprocessor 11 finds a record of the target 20 corresponding to the gotten GUID from the records in the list Y 33, the microprocessor 11 adds, to the new list X 42, a record formed on the basis of such record in the list Y 33, and deletes such record from the list Y 33.

If, in the above decision process of step S21, a record storing such chosen GUID does not exist in the list Y 33 (NO in S21), then the microprocessor 11 adds, to the new list X 42 and the new pointer list 40, records formed on the basis of such chosen GUID alone (S24). For example, if the GUID chosen in the above step S3 is "o" as shown by reference numeral 38 in FIG. 6, no record having GUID="o" exists in the list Y 33 as shown in FIG. 5. Accordingly, the microprocessor 11: stores, in the new list X 42 on the basis of such chosen GUID (o) alone, a record O whose device information (function information) is SPACE (blank) as shown by reference numeral 44 in FIG. 8; and furthermore adds, to the new pointer list 40, a record (data6) storing a pointer (*O) to the record O in the new list X 42 as shown by reference numeral 50 in FIG. 7.

After processes for all the GUIDs stored in the GUID list 34 are completed by repeating the processes as described above (YES in S8), the microprocessor 11 checks whether or not, in the current list X 32 prior to the bus reset occurrence as shown in FIG. 4, there remain record(s) not having been deleted. If the checking indicates that such record(s) remain in the current list X 32 (YES in S9), then the microprocessor 11 adds such remaining record(s) to the list Y 33. For example, if the current list X 32 prior to the bus reset occurrence has such content as shown in FIG. 4, and if the GUID list 34 acquired after the bus reset occurrence has such content as shown in FIG. 6, then resultantly a record C (refer to reference numeral 35 in FIG. 4) and a record F (refer to reference numeral 36 in FIG. 4) that have not been subjected to the above processes remain in the current list X 32 after completion of steps S1 to S8. Accordingly, the microprocessor 11 adds records 45 and 46 having the same contents as those of these records C and F, respectively, to the list Y 33 as shown in FIG. 9 (S10), respectively. For adding these records 45 and 46 to the list Y 33, the microprocessor 11 shifts the existing records in the list Y 33 down by the number of rows corresponding to the number of records to be added, and adds the records 45 and 46 to the top of the list Y 33 as shown in FIG. 9.

Thereafter, from the records in the new list X 42, the microprocessor 11 searches for and finds a record whose device information is SPACE, and sends, to the target 20 corresponding to the GUID in the thus found record, an inquiry command to inquire function of each target 20. In accordance with information returned from the target 20 as a result of the inquiry, the microprocessor 11 rewrites the record (e.g. record O as shown by reference numeral 44 in FIG. 8) whose device information is SPACE (S11). Thereafter, the microprocessor 11 deletes the current list X 32 and the current pointer list 31 prior to the bus reset occurrence, and holds the new list X 42 shown in FIG. 8 and the new pointer list 40 shown in FIG. 7 as the current list X 32 and the current pointer list 31, respectively (S12).

As described in the foregoing, the controller 10 according to the present embodiment stores the current list X 32, that is a list of function information (device information) of each target 20 currently connected to the network 8, and the list Y 33 that is a list of function information of each target 20 having been connected to the network 8 in the past. When the controller 10 gets GUID(s) from the target (s) 20 after the bus reset, the controller 10 acquires function information of the target(s) 20 corresponding to such gotten GUID(s) from the current list X 32 and the list Y 33 prior to the bus reset occurrence. Thereby, it becomes possible to reduce the number of times to perform the inquiry process, as compared with the conventional controller, that the controller 10 sends an inquiry command to each target 20 to inquire its function and receives information from each inquired target 20 as a result of the inquiry. Accordingly, after bus configuration is completed, it is possible to make a new list X 42 and a new pointer list 40, that are lists of function information of each target 20 connected to the network 8, while reducing the amount of data flowing through the bus 9. Furthermore, it is possible to shorten the recovery time for the network 8 to return to its normal state at the time of bus reset occurrence. These effects become more apparent in the cases where there are more targets 20 to be controlled by the controller 10, and where additional targets 20 are connected to or some targets 20 are removed from already configured network 8.

It is to be noted that the present invention is not limited to the embodiment, and various modifications are possible. For example, for adding a record to the list Y 33 in the present embodiment, the record is added to the top of the list Y 33. However, it is possible to add such record to the end of the list Y 33. Furthermore, a current pointer list 31 is used in the above embodiment, which is a circular list of records storing pointers to the records in the current list X 32. However, this current pointer list is not an essential element of the present invention, and is not needed to be a circular list as shown in FIG. 2 even if used.

This application is based on Japanese patent application 2003-403024 filed in Japan dated Dec. 2, 2003, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A controller device to be connected to an IEEE 1394 serial bus network via an IEEE 1394 serial bus, comprising:

an IEEE 1394 interface (hereafter referred to as "interface") to send and receive data, such as commands and contents, to and from each target device on the IEEE 1394 serial bus network;

a memory to store various data including function information of the each target device sent from the each target device via the interface; and a microprocessor to control the each target device in accordance with the function information of the each target device stored in the memory, wherein the memory stores a current function information list which is a list of function information of the each target device currently connected to the IEEE 1394 serial bus network, and which is made by the microprocessor in accordance with GUID and function information of the each target device sent from the each target device, wherein when the microprocessor gets GUID of the each target device from the each target device via the interface after bus reset, the microprocessor searches for a record of the target device corresponding to the gotten GUID from records in the current function information list, and wherein if the microprocessor finds a record of such target device corresponding to the gotten GUID as a result of the search, the microprocessor allows the record of such target device to remain in the current function information list.

2. The controller device to be connected to an IEEE 1394 serial bus network according to claim 1, wherein the memory further stores a past function information list which is a list of function information of each target device having been connected to the IEEE 1394 serial bus network in the past, wherein if the microprocessor fails to find a record of the target device corresponding to the gotten GUID as a result of the search from the records in the current function information list, the microprocessor searches for a record of the target device corresponding to the gotten GUID from records in the past function information list, and wherein when the microprocessor finds a record of the target device corresponding to the gotten GUID as a result of the search from the records in the past function information list, the microprocessor adds, to the current function information list, a record formed on the basis of such record in the past function information list, and deletes such record from the past function information list.

3. The controller device to be connected to an IEEE 1394 serial bus network according to claim 2, wherein the current function information list comprises: a first list of records actually storing data of function information of the each target device currently connected to the IEEE 1394 serial bus network; and a second list which is a circular list of records storing pointers to the records in the first list.

4. The controller device to be connected to an IEEE 1394 serial bus network according to claim 1, wherein the current function information list comprises: a first list of records actually storing data of function information of the each target device currently connected to the IEEE 1394 serial bus network; and a second list which is a circular list of records storing pointers to the records in the first list.

5. A controller device to be connected to an IEEE 1394 serial bus network via an IEEE 1394 serial bus, comprising:

a transmission means to send and receive data, such as commands and contents, to and from each target device on the IEEE 1394 serial bus network;

a storage means to store various data including function information of the each target device sent from the each target device via the transmission means; and a control means to control the each target device in accordance with the function information of the each target device stored in the storage means, wherein the storage means stores a current function information list which is a list of function information of the each target device currently connected to the IEEE 1394 serial bus network, and which is made by the control means in accordance with GUID and function information of the each target device sent from the each target device, wherein when the control means gets GUID of the each target device from the each target device via the transmission means after bus reset, the control means searches for a record of the target device corresponding to the gotten GUID from records in the current function information list, and wherein if the control means finds a record of such target device corresponding to the gotten GUID as a result of the search, the control means allows the record of such target device to remain in the current function information list.

6. The controller device to be connected to an IEEE 1394 serial bus network according to claim 5, wherein the storage means further stores a past function information list which is a list of function information of each target device having been connected to the IEEE 1394 serial bus network in the past, wherein if the control means fails to find a record of the target device corresponding to the gotten GUID as a result of the search from the records in the current function information list, the control means searches for a record of the target device corresponding to the gotten GUID from records in the past function information list, and wherein when the control means finds a record of the target device corresponding to the gotten GUID as a result of the search from the records in the past function information list, the control means adds, to the current function information list, a record formed on the basis of such record in the past function information list, and deletes such record from the past function information list.

\* \* \* \* \*